No. 842,467.

PATENTED JAN. 29, 1907.

R. P. KRONKE.
TUG LOOP.
APPLICATION FILED SEPT. 8, 1906.

# UNITED STATES PATENT OFFICE.

RICHARD P. KRONKE, OF MERIDEN, CONNECTICUT.

TUG-LOOP.

No. 842,467.  Specification of Letters Patent.  Patented Jan. 29, 1907.

Application filed September 8, 1906. Serial No. 333,755.

*To all whom it may concern:*

Be it known that I, RICHARD P. KRONKE, a citizen of the United States, residing at Meriden, in the county of New Haven and State of Connecticut, have invented a new and useful Improvement in Tug-Loops; and I do hereby declare the following, when taken in connection with the accompanying drawings and the letters of reference marked thereon, to be a full, clear, and exact description of the same, and which said drawings constitute part of this specification, and represent, in—

Figure 1:
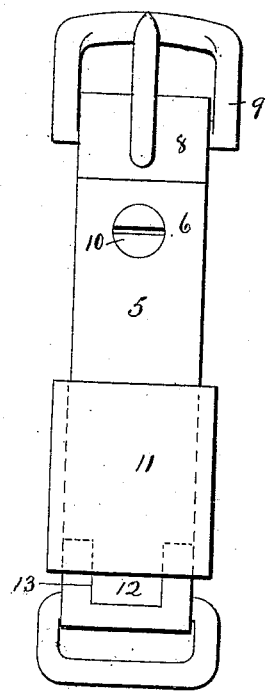
Figure 2:
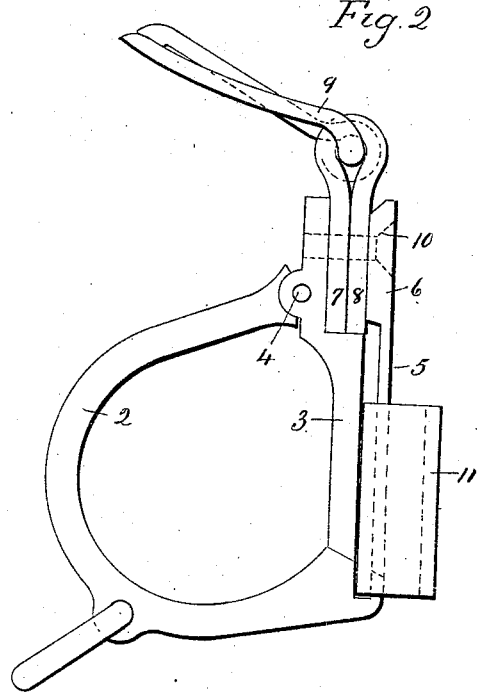
Figure 3:
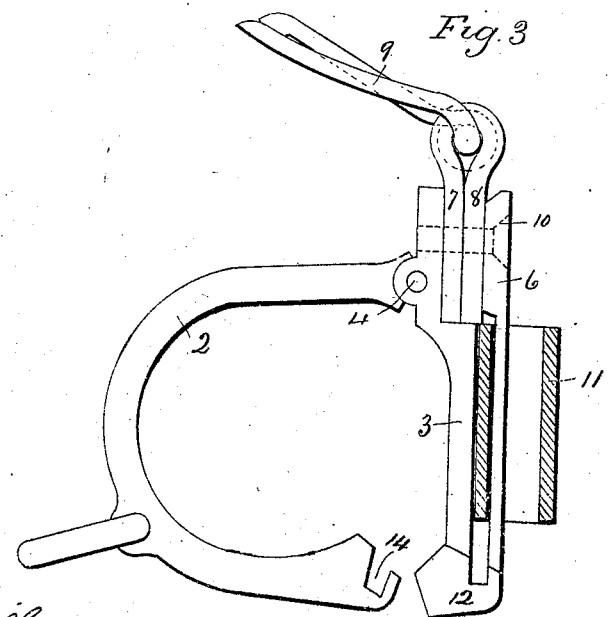

Figure 1, a front view of a tug-loop constructed in accordance with my invention; Fig. 2, a side view of the same with the parts in the closed position; Fig. 3, a side view with the parts in the open position and showing the tuck-loop in section.

This invention relates to an improvement in tug-loops, and particularly to such as are formed from metal and in two parts hinged together, so that the loop may be opened.

The object of the invention is a simple arrangement of parts whereby the tuck-loop serves to hold the parts in a closed position; and the invention consists in the construction and arrangement of parts, as will be hereinafter described, and particularly recited in the claim.

For convenience I will refer to the main portion 2 as the "loop" and the part 3 as the "gate," the two forming a tug-loop of usual form.

The gate is hinged to the upper end of the loop by the pintle 4 and is formed with a transverse slot entering from the upper end, forming a plate 5, the outer end 6 of which is thicker than the main portion. Between the outer end 6 and the upper end of the gate a space is formed to receive the ends 7 8 of a leather strap which engages with the frame of a buckle 9. A screw 10, passing through the end of the plate, through the ends of the strap, and into the upper end of the gate, secures the buckle thereto. Surrounding the plate and adapted to move up and down in the space between the plate and the gate is a tubular tuck-loop 11. The lower end 12 of the gate and plate are made narrow to enter a notch 13, formed in the end of the loop 2, which end is formed with recesses 14, which when the gate is closed will stand in line with the slot in the gate, so that the lower end of the tuck-loop may enter the recesses and thereby lock the lower end of the gate to the loop.

This tuck-loop will naturally remain in its locking position and will be held there by the harness-strap, which passes through the buckle and through the tuck-loop. If, however, it is desired to open the tug-loop, it is only necessary to raise the tuck-loop, when the gate may be readily turned.

I claim—

A tug-loop comprising a loop member and a gate hinged thereto said gate formed with a transverse slot, the lower end of the gate adapted to enter a notch formed in the end of the loop, the end of the loop formed with recesses in line with said slot in the gate when the gate is in the closed position and a tuck-loop passing through said slot and adapted at its lower end to enter said recesses—substantially as described.

In testimony whereof I have signed this specification in the presence of two subscribing witnesses.

RICHARD P. KRONKE.

Witnesses:
WILLIAM SCHAAL,
WYATT W. AVERY.